United States Patent [19]

Morishima et al.

[11] Patent Number: 5,631,341

[45] Date of Patent: May 20, 1997

[54] SELF-EMULSIFIABLE POLYISOCYANATE MIXTURE AND AQUEOUS COATING OR ADHESIVE COMPOSITION COMPRISING THE MIXTURE

[75] Inventors: Takeshi Morishima, Yokohama; Shin Konishi; Shinjiro Hama, both of Fujisawa, all of Japan

[73] Assignee: Nippon Polyurethane Industry Co., Ltd., Tokyo, Japan

[21] Appl. No.: 570,473

[22] Filed: Dec. 11, 1995

[51] Int. Cl.[6] ................................................. C08G 18/10
[52] U.S. Cl. .................. 528/60; 252/182.2; 252/182.22; 528/65; 528/67; 528/73; 528/905; 524/501; 524/507; 524/591; 525/127; 525/460
[58] Field of Search ................ 252/182.2, 182.22; 528/73, 905, 67, 60, 65; 524/501, 507, 591; 525/127, 460

[56] References Cited

U.S. PATENT DOCUMENTS

| | | | |
|---|---|---|---|
| 4,663,377 | 5/1987 | Hombach et al. | 524/196 |
| 5,200,489 | 4/1993 | Jacobs et al. | 528/49 |
| 5,252,696 | 10/1993 | Lass et al. | 528/49 |
| 5,373,050 | 12/1994 | Morikawa et al. | 524/591 |
| 5,502,149 | 3/1996 | Yoshida et al. | 528/60 |

FOREIGN PATENT DOCUMENTS

| | | |
|---|---|---|
| 60-255876 | 12/1985 | Japan. |
| 60-255877 | 12/1985 | Japan. |
| 62-50373 | 3/1987 | Japan. |
| 3-46033 | 7/1991 | Japan. |
| 5-35749 | 5/1993 | Japan. |

*Primary Examiner*—Rachel Gorr
*Attorney, Agent, or Firm*—Browdy and Neimark

[57] ABSTRACT

A self-emulsifiable polyisocyanate mixture having a hexamethylene diisocyanate monomer content of not more than 1.0% by weight and an average NCO functionality of 2.0 to 3.7 obtained by subjecting hexamethylene diisocyanate to urethanation with a branched dihydric alcohol having overall 4 to 35 carbon atoms, of which 2 to 33 carbon atoms are a total number of the carbon atoms possessed by one or more branches, a hydrophilic surfactant having one or more active hydrogen atoms capable of reacting with NCO group and 3 to 90 alkylene oxide units, an aliphatic compound having one or more active hydrogen atoms capable of reacting with NCO group and 8 or more carbon atoms and an unbranched glycol having 1 to 10 carbon atoms; uretdione-forming reaction; and isocyanurate-forming reaction. Said self-emulsifiable polyisocyanate mixture is excellent in compatibility, dispersion stability and NCO group-stability and can be combined with water or a water-soluble resin and/or an aqueous emulsion, and if necessary, an additive to provide an aqueous coating or adhesive composition excellent in heat resistance, workability, coating film appearance, weather resistance and adhesion to substrate.

19 Claims, No Drawings

SELF-EMULSIFIABLE POLYISOCYANATE MIXTURE AND AQUEOUS COATING OR ADHESIVE COMPOSITION COMPRISING THE MIXTURE

BACKGROUND OF THE INVENTION

1. Field of the Invention

This invention relates to a self-emulsifiable polyisocyanate mixture in which hexamethylene diisocyanate (referred to hereinafter as HDI) has been subjected to urethanation, uretdione-forming reaction and isocyanu-rate-forming reaction, an aqueous coating or adhesive composition comprising the same and a water-soluble resin and/or aqueous emulsion, and an aqueous dispersion comprising the self-emulsifiable polyisocyanate mixture and water for use as a paint or adhesive.

2. Description of the Prior Art

Coating compositions or adhesive compositions containing organic solvents have problems of safety and sanitation such as bad influence upon human body, explosive fire or the like, and environmental pollution such as air pollution or the like, so that a development of aqueous system has been actively made. In such an aqueous system, a water-soluble resin or aqueous emulsion has heretofore been used. However, with a one-pack system consisting only thereof, the required physical properties cannot be developed in many cases, and in general a cross-linking agent is co-used for improving weather resistance, adhesiveness and the like. The cross-linking system can rely on various reactions, and among them, examples using a self-emulsifiable polyisocyanate are stated in Japanese Patent Application Kokai No. 62-50,373 and U.S. Pat. No. 4,663,377. In both cases, a self-emulsifiable polyisocyanate into which a nonionic, hydrophilic surfactant has been introduced as a cross-linking agent is used. In particular, it is a known fact that a hydrophilic surfactant-modified, isocyanurate group-containing, self-emulsifiable polyisocyanate is used for the purpose of the heat resistance, weather resistance and adhesiveness of a water-soluble resin and aqueous emulsion.

However, conventional, hydrophilic surfactant-modified, isocyanurate group-containing, self-emulsifiable polyisocyanates have a high viscosity (usually, 2,000 to 3,000 cP/25° C.) and have a great difference in viscosity from water, and from a water-soluble resin having a low viscosity and the like, so that it has been difficult to uniformly disperse the former in the latter. In addition, when the degree of modification with a hydrophilic surfactant is high, the dispersion stability after the emulsification is good, but the viscosity increases at the time of phase transfer of from the water-in-oil type to an oil-in-water type, and hence a strong shearing force is required. Thus, there has been a problem of working. On the other hand, when the degree of modification with a hydrophilic surfactant is low, the affinity of the modified polymer with water is small, and therefore, the viscosity increase at the time of phase transfer is small. Hence, the emulsification can be achieved by a simple stirring, but the dispersion stability after the emulsification is poor and precipitation and the like are caused, so that an addition effect such as enhancement of weather resistance or the like is not developed. Therefore, when only the amount of the hydrophilic surfactant introduced is adjusted, it has been difficult to make the dispersion stability good without adversely affecting the workability.

A more important problem is that even when the dispersion stability of the self-emulsifiable polyisocyanate in a liquid composition is good, the compatibility of the self-emulsifiable polyisocyanate with a polyol resin is inferior, so that in such fields where a good coating appearance is required, such as for paint and the like, it has sometimes been impossible to use the self-emulsifiable polyisocyanate because the gloss and image clarity of the coating are deteriorated though weather resistance and heat resistance are enhanced.

SUMMARY OF THE INVENTION

The present inventors have made extensive research to solve the above prior art problems and have consequently found that the problems can be effectively solved by introducing, into a conventional, hydrophilic surfactant-modified, highly heat-resistant, isocyanurate group-containing, self-emulsifiable polyisocyanate, a dihydric alcohol having a branch at carbon atom (referred to hereinafter as the carbon-branched dihydric alcohol) and, if necessary, an aliphatic compound and a glycol free from branch at carbon atom (referred to hereinafter as the carbon-unbranched glycol) in amounts well-balanced with the hydrophilic surfactant for achieving the enhancement of compatibility with a polyol resin and by lowering the viscosity by utilizing the molecular weight-lowering effect of a uretdione group, which has a lower molecular weight structure than isocyanurate group.

According to this invention, there is provided a self-emulsifiable polyisocyanate mixture having a free hexamethylene diisocyanate monomer content of not more than 1.0% by weight and an average NCO functionality of 2.0 to 3.7 obtained by subjecting hexamethylene diisocyanate to urethanation with (a) a carbon-branched dihydric alcohol having overall 4 to 35 carbon atoms, of which 2 to 33 carbon atoms are a total number of carbon atoms possessed by one or more branches, (b) a hydrophilic surfactant having one or more active hydrogen atoms capable of reacting with isocyanate group having and 3 to 90 alkylene oxide units, (c) an aliphatic compound having one or more active hydrogen atoms capable of reacting with the isocyanate group having and at least 8 carbon atoms and (d) a carbon-unbranched glycol having 1 to 10 carbon atoms, and to a uretdione-forming reaction and an isocyanurate-forming reaction, whereby the component (a) is bonded in a proportion of 0.1 to 15% by weight based on the weight of the self-emulsifiable polyisocyanate compound, the component (b) is bonded in a proportion of 0.1 to 40% by weight based on the weight of the self-emulsifiable polyisocyanate mixture, the component (c) is bonded in a proportion of 0 to 30% by weight based on the weight of the self-emulsifiable polyisocyanate mixture, and the component (d) is bonded in a proportion of 0 to 5% by weight based on the weight of the self-emulsifiable polyisocyanate mixture; and wherein (1) the area percentage of a hexamethylene diisocyanate dimer having uretdione group determined by a differential refractometer detection in a gel permeation chromatography (GPC) is 3 to 55% and (2) the area percentage of hexamethylene diisocyanate trimer having an isocyanurate group determined by a differential refractometer detection in the GPC is 5 to 45%.

This invention also provides an aqueous coating or adhesive composition comprising the above self-emulsifiable polyisocyanate mixture, a water-soluble resin and/or an aqueous emulsion and, if necessary, an additive wherein the amount of the self-emulsifiable polyisocyanate mixture contained is 0.5 to 100 parts by weight per 100 parts by weight of the water-soluble resin or the solid content of the aqueous emulsion or a total thereof.

This invention further provides an aqueous dispersion for use as a paint or adhesive which comprises the above-mentioned self-emulsifiable polyisocyanate mixture, water and, if necessary, an additive, wherein the amount of the self-emulsifiable polyisocyanate mixture contained is 1 to 200 parts by weight per 100 parts by weight of water.

DETAILED DESCRIPTION OF THE INVENTION

The dihydric alcohol (a) used in this invention has, at least, two hydroxyl groups and one or more hydrocarbon groups in the molecule, said one or more hydrocarbon groups having overall 4 to 35 carbon atoms, among which 2 to 33 carbon atoms in total are possessed by one or more branching hydrocarbon chains, and when the self-emulsifiable polyisocyanate mixture is used in the preparation of a coating or adhesive composition, the dihydric alcohol (a) is necessary for effectively imparting to the self-emulsifiable polyisocyanate a good compatibility with other components. The term "dihydric alcohol" used herein means a compound composed of (i) a dihydric alcohol molecular skeleton consisting of two hydroxyl groups and the alcohol residue comprising, at least, one or more hydrocarbon groups, the alcohol residue being present between and bonding the two hydroxyl groups and (ii) one or more hydrocarbon groups bonded to the skeleton in the form of branches (referred to hereinafter as the branch hydrocarbon groups). The number of 2 to 33 carbon atoms possessed by one or more branch hydrocarbon groups includes not only carbon atoms possessed by the hydrocarbon groups in the form of branches but also carbon atoms contained in the rings present in the main chain but not counted as carbon atoms constituting the main chain. The dihydric alcohol has preferably two or more branch structures or one long branch hydrocarbon group, and in this case, the dihydric alcohol has more preferably a molecular weight of 100 to 1,000.

Examples of the dihydric alcohol include neopentyl glycol, 2,2-diethyl-1,3-propanediol, 2-n-butyl-2-ethyl-1,3-propanediol, 2,2,4-trimethyl-1,3-pentanediol, 2-ethyl-1,3-hexanediol, 2-n-hexadecane-1,2-ethylene glycol, 2-n-eicosane-1,2-ethylene glycol, 2-n-octacosane-1,2-ethylene glycol, 2,2-dimethyl-3-hydroxypropyl-2,2-dimethyl-3-hydroxypropionate, hydrogenated bisphenol A and the like. These dihydric alcohols may be used in combination of two or more.

In the dihydric alcohol (a), not only are the two hydroxyl groups present as two terminal groups of the alcohol molecule, but also there are one or more hydrocarbon groups bonded as side chains to the dihydric alcohol molecular skeleton. The one or more branch hydrocarbon groups have a good compatibility with the skeletal portion of the water-soluble resin or aqueous emulsion and hence they enhance the gloss and sharpness of a coating obtained from the composition containing the self-emulsifiable polyisocyanate mixture. Since the dihydric alcohol (a) is bifunctional, this is introduced into the polyisocyanate mixture not as molecular terminals but as side chains extending from the central portion of the molecular chain, so that the dihydric alcohol component acts more effectively. Since the dihydric alcohol (a) is hydrophobic, it contributes to the enhancement of the water-soluble resin or aqueous emulsion as the aliphatic compound mentioned hereinafter does.

The content of the dihydric alcohol (a) in the self-emulsifiable polyisocyanate mixture of this invention is 0.1 to 15% by weight, preferably 0.3 to 10% by weight and more preferably 0.5 to 5% by weight. When the content of the dihydric alcohol is less than 0.1% by weight, such problems are caused that the compatibility with the water-soluble resin or aqueous polymer emulsion becomes poor and that a partial gelation product is formed at the time of synthesis. On the other hand, when the content of the dihydric alcohol is more than 15% by weight, the characteristic features of the isocyanurate group and uretdione group which will be subsequently formed cannot be sufficiently developed and the lowering of viscosity and enhancement of weather resistance and heat resistance cannot be achieved.

As the hydrophilic surfactant (b) having one or more active hydrogen atoms capable of reacting with the NCO group for obtaining the self-emulsifiable polyisocyanate mixture of this invention, nonionic hydrophilic surfactants are preferable, and such compounds include polyalkylene ether alcohols, polyoxyalkylene fatty acid esters and the like. Ionic surfactants affect the reactivity of isocyanate, the coloration and deterioration of coating film in many cases, and precipitation, flocculation or the like is caused in some cases depending upon the ionic property of the water-soluble resin and aqueous emulsion. Therefore, the use of the nonionic surfactant is preferred.

As an active hydrogen compound used as an initiator in the production of the polyalkylene ether alcohol, there are mentioned, for example, methanol, n-butanol, cyclohexanol, phenol, ethylene glycol, propylene glycol, aniline, trimethylolpropane, glycerine and the like. Among them, the use of a short chain alcohol is preferred when dispersion stability is taken into consideration because the hydrophilic property becomes higher.

As the fatty acid used in the production of the polyoxyalkylene fatty acid ester, there are mentioned acetic acid, propionic acid, butyric acid and the like. Among them, the use of a lower fatty acid is preferred when dispersion stability is taken into consideration because the hydrophilic property becomes richer.

The polyether chain present in the polyalkylene ether alcohol, polyoxyalkylene fatty acid ester and the like has 3 to 90, preferably 5 to 50 and more preferably 8 to 20 alkylene oxide units. As the alkylene oxide unit, a pure ethylene oxide chain is preferable; however, a mixed alkylene oxide chain containing 70% or more of ethylene oxide units based on the total alkylene oxide units may be used.

The content of the hydrophilic surfactant (b) in the self-emulsifiable polyisocyanate mixture of this invention is 0.1 to 40% by weight, preferably 0.5 to 30% by weight and more preferably 1 to 20% by weight. When the amount of the hydrophilic surfactant introduced is less than 0.1% by weight, the polyisocyanate mixture modified with this component exhibits substantially no improvement in water-dispersibility, and, for example, precipitation is caused. Therefore, such a small amount is not desirable. On the contrary, when the amount is more than 40% by weight, the amount of the dihydric alcohol (a) or the like must be increased correspondingly to the amount of the hydrophilic surfactant (b) because the affinity of the modified polyisocyanate mixture for water becomes too strong and the stability of the NCO group in water is deteriorated.

As the aliphatic compound (c) having one or more active hydrogen atoms capable of reacting with the NCO group and having 8 or more carbon atoms, there are mentioned monohydric alcohols, for example, octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, cinnamyl alcohol and the like. In addition, as the aliphatic compound (c), there are mentioned fatty acid esters having one or more active hydrogen atoms capable of reacting with the NCO group in which ester the total number of carbon atoms of the fatty acid and the alcohol is 8 or more, and for securing the stability of NCO group, said fatty acid esters are preferable. The starting fatty acid includes α-hydroxypropionic acid, hydroxysuccinic acid, dihydroxysuccinic acid, ε-hydroxypropane-1,2,3-tricarboxylic acid, hydroxyacetic acid, α-hydroxybutyric acid, hydroxystearic acid, ricinoleic acid, ricinoelaidic acid, ricinostearolic acid, salicylic acid, mandelic acid and the like. As the alcohol, there are mentioned methyl alcohol, ethyl alcohol, propyl alcohol, isopropyl alcohol, butyl alcohol and the like.

If considering the balance between hydrophilicity and hydrophobicity, the hydrophilicity is so large that the stability of the NCO groups in water or the water-soluble resin or aqueous emulsion is damaged, the aliphatic compound (c) is introduced as necessary. It is considered that after this aliphatic compound has been introduced into HDI, the hydrophilic chain portion control the reaction between the unreacted NCO groups present in the neighborhood and the water molecules present therearound by steric hindrance or surface-chemically based on the hydrophilicity. Accordingly, the hydrophilic chain having a length to some extent is more effective, so that the hydrophilic chain is required to have at least 8 carbon atoms, preferably least 12 carbon atoms. Also, it is more preferable that the active hydrogen atoms reacting with the NCO group are present not at the terminals but in the neighborhood of the center of the main chain.

The content of the aliphatic compound (c) in the self-emulsifiable polyisocyanate mixture of this invention is 0 to 30% by weight, preferably 0 to 25% by weight and more preferably 0 to 20% by weight, based on the weight of the self-emulsifiable polyisocyanate mixture. When the amount of the aliphatic compound introduced is more than 30% by weight, the dispersion stability is deteriorated and hence such an amount is not desirable.

The glycol (d) is a compound having 1 to 10 carbon atoms whose alkylene group is not branched. This glycol can be used in an amount ranging from 0 to 5% by weight, preferably from 0.1 to 4% by weight, and more preferably from 0.2 to 3% by weight, based on the self-emulsifiable polyisocyanate mixture for allowing the polyisocyanate mixture to exhibit its well-balanced performance. Examples of the glycol include ethylene glycol, 1,2-propylene glycol, 1,3-propylene glycol, 1,3-butanediol, 1,4-butanediol, 1,6-hexanediol, 1,8-octanediol and 1,10-decanediol.

In this invention, when the amounts of the dihydric alcohol (a), the hydrophilic surfactant (b), the aliphatic compound (c) and the glycol (d) introduced are excessively large, the NCO content of the modified polyisocyanate mixture is required to be reduced correspondingly, and the characteristic features of isocyanurate group and uretdione group cannot be sufficiently developed, so that the lowering of viscosity and the enhancement of weather resistance cannot be achieved. Therefore, the introduction of the components (a), (b), (c) and (d) in such large amounts should be avoided. Accordingly, the upper limit of the degree of modification with the dihydric alcohol, the hydrophilic surfactant, the aliphatic compound and the glycol should be such an amount as to correspond to an average NCO functionality of 2.0 or more.

In this invention, the HDI dimer having a uretdione group has a lower molecular weight than that of HDI trimer having an isocyanurate group, so that the lowering of viscosity aimed at by this invention is achieved by introducing the uretdione group into each molecule of the self-emulsifiable polyisocyanate mixture. By lowering the viscosity of the polyisocyanate mixture, the difference between the viscosity of the polyisocyanate mixture and the viscosity of the water-soluble resin or aqueous emulsion becomes small. Also, the increase of viscosity resulting from phase transfer after the addition of the water-soluble resin or aqueous emulsion can be inhibited. Therefore, a simple stirring can be used in the emulsification though a strong shearing force has heretofore been required in the emulsification, and hence, the workability is improved.

The area percentage (1) of the HDI dimer having a uretdione group in the self-emulsifiable polyisocyanate mixture of this invention determined by a differential refractometer detection in the GPC is 3 to 55%, preferably 4 to 50% and more preferably 5 to 47%, and the area percentage (2) of the HDI trimer having an isocyanurate group determined by a differential refractometer detection in the GPC is 5 to 45%, preferably 10 to 40% and more preferably 15 to 35%. When the area percentage (1) of the HDI dimer having a uretdione group is less than 3%, it becomes impossible to realize the lower viscosity for the enhancement of workability aimed at by this invention. On the contrary, when the area percentage (2) of the HDI dimer having a uretdione group is more than 55% and the content of the HDI trimer having an isocyanurate group is less than 5%, the heat resistance and the weather resistance which the isocyanurate group has are impaired.

The NCO content of the self-emulsifiable polyisocyanate mixture of this invention is 5 to 25% by weight, preferably 6 to 24.5% by weight and more preferably 7 to 24% by weight. When the NCO content is less than 5%, the addition effect becomes small, and hence, such a content is not desirable.

Thus, a self-emulsifiable polyisocyanate mixture having an average NCO functionality of 2.0 to 3.7 can be obtained by introducing into HDI the dihydric alcohol (a), the hydrophilic surfactant (b), the optional aliphatic compound (c) and the optional glycol (d) in a good balance and lowering the viscosity utilizing the molecular weight-lowering effect of the uretdione group having a lower molecular weight structure than the isocyanurate group.

In order to obtain the polyisocyanate mixture of this invention, it is preferable to use a reaction which can produce simultaneously uretdione group and isocyanurate group, and in order to obtain the self-emulsifiable polyisocyanate mixture of the low viscosity type aimed at by this invention, it is necessary to terminate the polymer-producing reaction at an early stage for inhibiting the production of the high polymer as much as possible.

As an effective catalyst for obtaining a polyisocyanate mixture containing simultaneously a uretdione group and an isocyanurate group, preferable are phosphines such as triethylphosphine, dibutylethylphosphine, tripropylphosphine, triisopropylphosphine, tributylphosphine, triisobutylphosphine, tri-tert-butylphosphine, triamylphosphine, trioctylphosphine, tribenzylphosphine, benzylmethylphosphine and the like.

After the desired conversion has been reached, for example, phosphoric acid and methyl p-toluenesulfonate are added to terminate the reaction, and the free unreacted HDI monomer present in the reaction mixture is removed until the content of the remaining HDI monomer becomes 1.0% by weight or less by an appropriate means, such as extraction (for example, extraction with n-hexane) or by a thin film distillation under a highly reduced pressure of 0.01 to 0.1 Torr.

Incidentally, in the polyisocyanate mixture of this invention, when a part of the isocyanate groups of HDI is urethanated with the dihydric alcohol, the catalytic effect of the urethane linkage produced enables the isocyanurate-forming reaction and the uretdione-forming reaction to proceed smoothly without producing a partial gelation product (high molecular weight product). This catalytic effect is equivalent regardless of whether this urethane-forming reaction is effected before or simultaneously with the isocyanurate-forming reaction and uretdione-forming reaction.

Usually, these reactions may be carried out in an inert solvent which is conventionally used in the polyurethane industry, for example, an aromatic solvent such as toluene, xylene, Swasol (a trade name of Cosmo Petroleum Co., Ltd. for an aromatic hydrocarbon solvent), Solvesso (a trade name of Exxon Chemical Corp. for an aromatic hydrocarbon solvent) or the like; a ketone solvent such as methyl ethyl ketone (MEK), methyl isobutyl ketone, cyclohexanone or the like; an ester solvent such as ethyl acetate, butyl acetate, isobutyl acetate or the like; a glycol ether ester solvent such as ethylene glycol ethyl ether acetate, propylene glycol methyl ether acetate, 3-methyl-3-methoxybutyl acetate, ethyl 3-ethoxypropionate or the like; an ether solvent such as tetrahydrofuran, dioxane or the like. These solvents may be used alone or in combination of two or more, and hence, the viscosity can be adjusted depending upon the use conditions. However, when the polyisocyanate mixture of this invention is intended to be used in a coating composition or an adhesive composition, it is added to a water-soluble resin or an aqueous emulsion, so that a polar solvent which can be dispersed in or is compatible with water such as the ketone solvent, the ester solvent, the ether solvent or the like is preferred. When the polar solvent is contained, the viscosity becomes lower, and hence, the polyisocyanate mixture becomes easier to disperse in the water-soluble resin or the aqueous emulsion.

The reaction temperature is usually selected from the range of from 50° C. to 90° C.

In order to obtain the self-emulsifiable polyisocyanate mixture of this invention, there may be used, for example, (1) a method which comprises adding a catalyst to an NCO-terminated prepolymer obtained by adding the dihydric alcohol and if necessary the unbranched glycol having 1 to 10 carbon atoms to HDI, to introduce uretdione group and isocyanurate group into the prepolymer and thereafter, further adding the hydrophilic surfactant having one or more active hydrogen atoms capable of reacting with the NCO group to the prepolymer into which uretdione group and isocyanurate group have been introduced, and if necessary, reacting the prepolymer with the aliphatic compound having 8 or more carbon atoms and one or more active hydrogen atoms capable of reacting with the NCO group or (2) a method which comprises adding to HDI the dihydric alcohol and the hydrophilic surfactant having one or more active hydrogen atoms capable of reacting with the NCO group, and, if necessary, reacting the resulting addition product with the aliphatic compound having one or more active hydrogen atoms capable of reacting with the NCO group and the unbranched glycol having 1 to 10 carbon atoms, and thereafter, adding a catalyst thereto to introduce uretdione group and isocyanurate group thereinto.

However, when it is necessary to make lower the viscosity of the self-emulsifiable polyisocyanate mixture, it is preferable to introduce uretdione group and isocyanurate group after the HDI has been urethanated with all the starting materials capable of reacting with the NCO group as in the above method (2) because the viscosity of the polyisocyanate mixture becomes lower.

The self-emulsifiable polyisocyanate mixture of this invention can be blended with a water-soluble resin and/or an aqueous emulsion and then used as a paint (including a coating agent) or adhesive to be applied to metals, wooden articles, plastics, inorganic materials and the like and as a sealer, an ink, a fiber-treating agent for natural or synthetic fibers, glass fibers or the like, a sizing agent or the like.

The addition effect of the self-emulsifiable polyisocyanate mixture is that excellent physical properties, heat resistance, water resistance, solvent resistance, adhesiveness and the like can be imparted to the resulting coating film as compared with conventional ones. Also, when the hydrophobic chain having an adequate length and the hydrophilic chain having an adequate length are introduced into the self-emulsifiable polyisocyanate mixture of this invention taking a balance between the two chains into consideration, the reaction of the NCO group with water is controlled by the hydrophobic chain introduced, and hence, the performance-improving effect is continued highly stably and over a long period of time. The water-soluble resin or the aqueous emulsion may be added to an aqueous dispersion of the self-emulsifiable polyisocyanate mixture in water or the self-emulsifiable polyisocyanate mixture diluted with a solvent which is usually used in the polyurethane industry or may, if necessary, be directly added to the self-emulsifiable polyisocyanate mixture.

The water-soluble resin used in this invention includes polyvinyl alcohol, water-soluble ethylene-vinyl acetate copolymer, polyethylene oxide, water-soluble acrylic resin, water-soluble epoxy resin, water-soluble cellulose derivative, water-soluble polyester, water-soluble lignin derivative, water-soluble fluorine-containing resin, water-soluble silicone resin and the like. Fluorine-containing emulsions having excellent weather resistance and contamination resistance are not crosslinked, and hence, are poor in solvent resistance. However, when they are used together with the self-emulsifiable polyisocyanate mixture of this invention, the weather resistance, contamination resistance and solvent resistance can be further enhanced.

The aqueous emulsion used in this invention includes all so-called latexes and emulsions. Specific examples thereof include rubber latexes, for example, styrene-butadiene copolymer latex, acrylonitrile-butadiene copolymer latex, methyl methacrylate-butadiene copolymer latex, chloroprene latex, polybutadiene latex and the like; polyacrylic acid ester latex; polyvinylidene chloride latex; polybutadiene latex; carboxyl-modified products of these latexes; polyvinyl chloride emulsion; urethane-acrylic rubber emulsion; silicone-acrylic rubber emulsion, vinyl acetate-acrylic rubber emulsion, urethane emulsion, acrylic rubber emulsion and the like. Fluorine-containing emulsions having excellent weather resistance and contamination resistance are not cross-linked, and hence, are poor in solvent resistance. However, when they are used together with the self-emulsifiable polyisocyanate mixture of this invention, the weather resistance, contamination resistance and solvent resistance can be further enhanced.

Even when the water-soluble resin and/or aqueous emulsion used in this invention has no or only a little active hydrogen atom capable of reacting with NCO group, since the self-emulsifiable polyisocyanate mixture can react with water in the water-soluble resin and/or aqueous emulsion to form a polyurea compound whereby a hard and tough coating film is formed, the weather resistance of the coating film is enhanced. In addition, since the NCO group reacts with the active hydrogen atom present on the surface of an adherend, the adhesiveness is also enhanced. However, when a water-soluble resin and/or aqueous emulsion having many active hydrogen atoms capable of reacting with NCO group at ordinary temperature is used, the active hydrogen atoms in the water-soluble resin and/or aqueous emulsion react with the NCO groups present in the self-emulsifiable polyisocyanate mixture to form a cross-linked structure, so that the weather resistance, solvent resistance and the like of the resulting coating film are further improved. Also, when baking is effected at high temperatures, the uretdione group is dissociated to generate NCO groups, and hence, in the baking case, the addition effect appears remarkably as compared with the use at ordinary temperature. Therefore, the water-soluble resin and/or aqueous emulsion should preferably have active hydrogen atoms capable of reacting with NCO group.

In the aqueous coating or adhesive composition of this invention, the amount of the self-emulsifiable polyisocyanate mixture contained is 0.5 to 100 parts by weight, preferably 1 to 60 parts by weight and more preferably 5 to 40 parts by weight, per 100 parts by weight of the water-soluble resin, the solid content of the aqueous emulsion or a total of the two.

The self-emulsifiable polyisocyanate mixture can be mixed with water to prepare an aqueous dispersion, and this aqueous dispersion can be used as an aqueous paint (including aqueous coating agent) or an aqueous adhesive for paper, wooden materials, plastics, metallic materials, inorganic materials and the like.

In the above aqueous dispersion, the proportion of the self-emulsifiable polyisocyanate mixture to water is 1 to 200 parts by weight, preferably 10 to 100 parts by weight and more preferably 20 to 50 parts by weight, of the self-emulsifiable polyisocyanate mixture per 100 parts by weight of water.

This aqueous dispersion is considered to become a paint or adhesive having a very good adhesiveness because the NCO groups relatively stably present even after the dispersion in water react with the active hydrogen atoms present on the surface of the above-mentioned substrates. Even after a considerable time has elapsed from the dispersion of the self-emulsifiable polyisocyanate mixture in water and the NCO group has disappeared, the aqueous dispersion is present stably in the emulsion state in which the dispersed particles have a diameter of about 0.1 to 0.3µ and the coating film comprising mainly a polyurea compound obtained by drying at ordinary temperature or heat-drying the aqueous dispersion becomes hard and tough, so that the above aqueous dispersion can be used in the form of a film or sheet, in the form of a paint (including a coating agent) for various substrates, or the like. Incidentally, when the adhesiveness to a substrate is important, it is preferable that the aqueous dispersion is used in the state that NCO groups are still present.

The aqueous coating or adhesive composition comprising the self-emulsifiable polyisocyanate mixture and the water-soluble resin and/or aqueous emulsion may, if necessary, contain additives which are usually used in the aqueous binary system. Specific examples of the additives include pigments, dispersion stabilizers, viscosity-adjusting agents, leveling agents, antigelling agents, light stabilizers, antioxidants, ultraviolet absorbers, heat-resistance-enhancing agents, inorganic or organic fillers, plasticizers, lubricants, antistatic agents, reinforcing agents, catalysts and the like. Also, the aqueous dispersion for use as a paint or adhesive comprising the self-emulsifiable polyisocyanate mixture of this invention and water may contain the above-mentioned additives.

In the self-emulsifiable polyisocyanate mixture of this invention, the compatibility with polyol resins, the dispersion stability in water or a water-soluble resin or aqueous emulsion and the enhancement of the stability of NCO group can be achieved by introducing a hydrophobic, carbon-branched dihydric alcohol and a hydrophilic surfactant, and if necessary, an aliphatic compound and an unbranched glycol in a well-balanced proportion into each molecule of the polyisocyanate mixture containing isocyanurate group and uretdione group. Also, the heat resistance is enhanced by the isocyanurate group and the viscosity is made lower by utilizing the molecular weight-lowering effect of the uretdione structure which has a lower molecular weight than the isocyanurate group and hence the workability is also enhanced and the use of the self-emulsifiable polyisocyanate mixture is made possible only by a simple stirring. Moreover, the enhancement of the compatibility with polyol resins makes it possible to enhance the gloss and image clarity (coating appearance) of a coating film formed from a coating composition comprising the self-emulsifiable polyisocyanate mixture and to enhance the heat resistance, weather resistance and adhesiveness to substrate of the coating composition.

DESCRIPTION OF THE PREFERRED EMBODIMENTS

Examples are shown below for explaining this invention in more detail; however, this invention should not be construed to be limited to the Examples. Unless otherwise specified, "part" and "%" used in Production Examples, Examples, Comparative Examples are by weight.
[Production of self-emulsifiable polyisocyanate mixture]
Production of modified HDI

Production Example 1

In a reactor equipped with a stirrer, a thermometer, a nitrogen-sealing tube and a condenser were placed 300 parts of HDI and 2.3 parts of 2-n-butyl-2-ethyl-1,3-propanediol, and the reactor was purged with nitrogen. The mixture was heated to 60°–70° C. with stirring, and subjected to reaction at the same temperature for three hours. At this time, the NCO content in the reaction mixture was measured to find that it was 49.1%.

Subsequently, 0.3 part of tributylphosphine was added as a catalyst, and the mixture was subjected to uretdione-forming reaction and isocyanurate-forming reaction at the same temperature for eight hours.

To the resulting reaction mixture was added 0.33 part of methyl p-toluenesulfonate to terminate the reaction, and thereafter, the HDI monomer was removed by a thin film distillation at 120° C. at 0.01 Torr.

The solution thus obtained was pale yellow and transparent; the NCO content was 22.3%; the viscosity was 90 cP/25° C.; the HDI monomer content was 0.4%; the NCO functionality was 2.3; the content of the dihydric alcohol having two or more carbon atoms each having branch was 3.0%; the area percentage of the HDI dimer having uretdione group determined by a differential refractometer detection in the GPC analysis was 48%; and the area percentage of the HDI trimer having isocyanurate group determined by a differential refractometer in the GPC analysis was 32%. The yield was 25%.

This modified HDI containing uretdione group and isocyanurate group is referred to hereinafter as A-1.

Production Example 2

In a reactor equipped with a stirrer, a thermometer, a nitrogen-sealing tube, a condenser were placed 300 parts of HDI and 2.4 parts of 1,3-butanediol as the unbranched glycol, and the reactor was purged with nitrogen, after which the mixture was warmed to 80° C. with stirring and subjected to reaction at the same temperature for two hours. At this time, the NCO content of the reaction mixture was measured to find that it was 48.8%.

Subsequently, 0.06 part of potassium caprylate was added as a catalyst and 0.3 part of phenol was added as a cocatalyst, after which the resulting mixture was subjected to isocyanurate-forming reaction at 60° C. for 4.5 hours.

To the reaction mixture was added 0.042 part of phosphoric acid was added as a terminator to terminate the reaction, and thereafter, the unreacted HDI monomer was removed by a thin film distillation at 120° C. at 0.01 hours.

The solution thus obtained was pale yellow and transparent; the NCO content was 21.1%; the viscosity was 2,200 cP/25° C.; the HDI monomer content was 0.4%; the NCO functionality was 3.7; and the area percentage of the HDI trimer having an isocyanurate group determined by a differential refractometer detection in the GPC analysis was 42%. Also, the presence of isocyanate group, isocyanurate group and urethane group in the product was confirmed by FT-IR and $^{13}$C-NMR; however, no uretdione group was confirmed. The yield was 32%.

This isocyanurate group-containing modified HDI is referred to hereinafter as A-2.

Production of self-emulsifiable polyisocyanate mixture

EXAMPLE 1

To 100 parts of the modified HDI A-1 was added 2 parts of polyoxyethylene methyl ether (manufactured by Toho Chiba Kogyo Kabushiki Kaisha, hydroxyl value: 140, number of ethylene oxide units: 9) (referred to hereinafter as Methoxy PEG#400). The temperature of the mixture was elevated to 75° C. and the mixture was subjected to reaction for three hours while the mixture was kept at 75° C. to obtain a pale yellow, transparent, self-emulsifiable polyisocyanate mixture (A) in which the NCO content was 21.7%; the viscosity was 110 cP/25° C.; the HDI monomer content was 0.4%; the NCO functionality was 2.3; the content of the dihydric alcohol having 2 or more carbon atoms each having branch was 2.9%; the content of the hydrophilic surfactant was 2.0%; the area percentage of the HDI dimer having uretdione group determined by a differential refractometer in the GPC analysis was 46%; and the area percentage of the HDI trimer having isocyanurate group determined by a differential refractometer in the GPC analysis was 31%.

Physical properties and composition of this mixture are together shown in Table 1.

EXAMPLE 2

To 75 parts of the modified HDI A-1 and 25 parts of the modified HDI A-2 were added 8 parts of the Methoxy PEG#400 and 2 parts of methyl recinoleate (manufactured by Ito Seiyu Kabushiki Kaisha, hydroxyl value: 160) (referred to hereinafter as the CO-FA methyl ester), and the temperature of the resulting mixture was elevated to 75° C., at which temperature the mixture was subjected to reaction for three hours to obtain a pale yellow, transparent, self-emulsifiable polyisocyanate mixture (B) having the properties and composition shown in Table 1.

EXAMPLE 3

To 50 parts of the modified HDI A-1 and 50 parts of the modified HDI A-2 were added 12 parts of Methoxy PEG#400 and 4 parts of the CO-FA methyl ester, and the temperature of the resulting mixture was elevated to 75° C., at which temperature the mixture was subjected to reaction for three hours to obtain a pale yellow, transparent, self-emulsifiable polyisocyanate mixture (C) having the properties and composition shown in Table 1.

EXAMPLE 4

To 25 parts of the modified HDI A-1 and 75 parts of the modified HDI A-2 was added 16 parts of the Methoxy PEG#400, and the temperature of the resulting mixture was elevated to 75° C., at which temperature the mixture was subjected to reaction for three hours to obtain a pale yellow, transparent, self-emulsifiable polyisocyanate mixture (D) having the properties and composition shown in Table 1.

EXAMPLE 5

To 50 parts of the modified HDI A-1 and 50 parts of the modified HDI A-2 was added 16 parts of the Methoxy PEG#400, and the temperature of the resulting mixture was elevated to 75° C., at which temperature the mixture was subjected to reaction for three hours to obtain a pale yellow, transparent, self-emulsifiable polyisocyanate mixture (E) having the properties and composition shown in Table 1.

EXAMPLE 6

In a reactor equipped with a stirrer, a thermometer, a nitrogen-sealing tube and a condenser were placed 300 parts of HDI, 5.5 parts of 2-n-butyl-2-ethyl-1,3-propanediol and 16 parts of the Methoxy PEG#400, and the reactor was purged with nitrogen, after which the mixture was warmed to 60°–70° C. with stirring and subjected to reaction at the same temperature for three hours. At this time, the NCO content of the reaction mixture was measured to find that it was 45.0%.

Subsequently, 0.3 part of tributylphosphine was added as a catalyst, and the resulting mixture was subjected to uretdione-forming reaction and isocyanurate-forming reaction at the same temperature for eight hours.

To this reaction mixture was added 0.33 part of methyl p-toluenesulfonate to terminate the reaction, after which the unreacted HDI monomer was removed by a thin film distillation at 120° C. at 0.01 Torr, to obtain a pale yellow, transparent, self-emulsifiable polyisocyanate mixture (F) having the properties and composition shown in Table 1. The yield was 35%.

EXAMPLE 7

In a reactor equipped with a stirrer, a thermometer, a nitrogen-sealing tube and a condenser were placed 300 parts of HDI, 2.3 parts of 2-n-butyl-2-ethyl-1,3-propanediol and 8 parts of the Methoxy PEG#400, and the reactor was purged with nitrogen, after which the mixture was warmed to 60°–70° C. with stirring and subjected to reaction at the same temperature for three hours. At this time, the NCO content of the reaction mixture was measured to find that it was 47.6%.

Subsequently, 1.0 part of tributylphosphine was added as a catalyst, and the resulting mixture was subjected to uretdione-forming reaction and isocyanurate-forming reaction at the same temperature for 48 hours.

To this reaction mixture was added 1.1 part of methyl p-toluenesulfonate to terminate the reaction, after which the unreacted HDI monomer was removed by a thin film distillation at 120° C. at 0.01 Torr, to obtain a pale yellow, transparent, self-emulsifiable polyisocyanate mixture (G) having the properties and composition shown in Table 2. The yield was 40%.

EXAMPLE 8

In a reactor equipped with a stirrer, a thermometer, a nitrogen-sealing tube and a condenser were placed 300 parts of HDI, 4 parts of 2,2,4-trimethyl-1,3-pentanediol and 12 parts of the Methoxy PEG#400, and the reactor was purged with nitrogen, after which the mixture was warmed to 60°–70° C. with stirring and subjected to reaction at the same temperature for three hours. At this time, the NCO content of the reaction mixture was measured to find that it was 46.3%.

Subsequently, 0.7 part of tributylphosphine was added as a catalyst, and the resulting mixture was subjected to uretdione-forming reaction and isocyanurate-forming reaction at the same temperature for 24 hours.

To this reaction mixture was added 0.77 part of methyl p-toluenesulfonate to terminate the reaction, after which the unreacted HDI monomer was removed by a thin film distillation at 120° C. at 0.01 Torr, to obtain a pale yellow, transparent, self-emulsifiable polyisocyanate mixture (H) having the properties and composition shown in Table 2. The yield was 38%.

EXAMPLE 9

In a reactor equipped with a stirrer, a thermometer, a nitrogen-sealing tube and a condenser were placed 300 parts of HDI, 1.5 parts of neopentyl glycol, 20 parts of the Methoxy PEG#400 and 18 parts of the CO-FA methyl ester, and the reactor was purged with nitrogen, after which the mixture was warmed to 60°–70° C. with stirring and subjected to reaction at the same temperature for three hours. At this time, the NCO content of the reaction mixture was measured to find that it was 42.4%.

Subsequently, 1.0 part of tributylphosphine was added as a catalyst, and the resulting mixture was subjected to uretdione-forming reaction and isocyanurate-forming reaction at the same temperature for 48 hours.

To this reaction mixture was added 1.1 parts of methyl p-toluenesulfonate terminate the reaction, after which the unreacted HDI monomer was removed by a thin film distillation at 120° C. at 0.01 Tort, to obtain a pale yellow, transparent, self-emulsifiable polyisocyanate mixture (I) having the properties and composition shown in Table 2. The yield was 42%.

Comparative Example 1

To 100 parts of the modified HDI A-2 was added 16 parts of the Methoxy PEG#400, and the temperature of the resulting mixture was elevated to 75° C., at which temperature the mixture was subjected to reaction for three hours, to obtain a pale yellow, transparent, self-emulsifiable polyisocyanate mixture (J) having the properties and composition shown in Table 2. It was confirmed by FT-IR and $^{13}$C-NMR that in the solution obtained, isocyanurate group and urethane group were present, but no uretdione group was present.

Comparative Example 2

To 100 parts of the modified HDI A-2 was added 2 parts of the Methoxy PEG#400, and the temperature of the resulting mixture was elevated to 75° C., at which temperature the mixture was subjected to reaction for three hours, to obtain a pale yellow, transparent, self-emulsifiable polyisocyanate mixture (K) having the properties and composition shown in Table 2. It was confirmed by FT-IR and $^{13}$C-NMR that in the solution obtained, isocyanurate group and urethane group were present, but no uretdione group was present.

Comparative Example 3

In a reactor equipped with a stirrer, a thermometer, a nitrogen-sealing tube and a condenser were placed 300 parts of HDI, 0.5 part of 2-n-butyl-2-ethyl-1,3-propanediol and 2 parts of the Methoxy PEG#400, and the reactor was purged with nitrogen, after which the mixture was warmed to 60°–70° C. with stirring and subjected to reaction at the same temperature for three hours. At this time, the NCO content of the reaction mixture was measured to find that it was 49.4%.

Subsequently, 0.1 part of tributylphosphine was added as a catalyst, and the resulting mixture was subjected to uretdione-forming reaction and isocyanurate-forming reaction at the same temperature for 2 hours.

To this reaction mixture was added 0.11 part of methyl p-toluenesulfonate to terminate the reaction, after which the unreacted HDI monomer was removed by a thin film distillation at 120° C. at 0.01 Torr, to obtain a pale yellow, transparent, self-emulsifiable polyisocyanate mixture (L) having the properties and composition shown in Table 2. The yield was 10%.

[Evaluation of dispersibility in water or aqueous emulsion]

To 100 parts of water or an acrylic rubber emulsion A (WA-1015ND, a trade name of Ajia Kogyo Kabushiki Kaisha, solid content: 50%, viscosity: 300 cP/25° C.) was added 10 parts of one of the self-emulsifiable polyisocyanate mixtures obtained in Examples 1 to 9 or one of the self-emulsifiable polyisocyanate mixtures obtained in Comparative Examples 1 to 3, and the resulting mixture was stirred by hand using a glass stick for one minute, after which the appearance of the resulting dispersion was observed.

Evaluation results are together shown in Tables 1 and 2, provided that the criterion for the evaluation of dispersibility was as follows:

Good appearance o>Δ>x Not dispersed and viscosity increased

TABLE 1

| Example No. | 1 | 2 | 3 | 4 | 5 | 6 |
|---|---|---|---|---|---|---|
| Self-emulsifiable polyisocyanate mixture | A | B | C | D | E | F |
| NCO content (%) | 21.7 | 19.3 | 17.2 | 17.0 | 17.3 | 18.7 |
| Viscosity (cP/25° C.) | 110 | 300 | 500 | 900 | 460 | 100 |
| NCO functinality | 2.3 | 2.5 | 2.7 | 3.1 | 2.8 | 2.1 |
| Carbon-branched dihydric alcohol content (%) | 2.9 | 2.0 | 1.3 | 0.7 | 0.7 | 4.9 |
| Hydrophilic surfactant content (%) | 2.0 | 7.3 | 10.3 | 13.8 | 13.8 | 14.2 |
| Aliphatic compound content (%) | | 1.8 | 3.4 | | | |
| Carbon-unbranched glycol content (%) | | 0.6 | 1.1 | 1.1 | 1.6 | |
| HDI dimer content (%) | 46 | 26 | 10 | 8 | 16 | 37 |

TABLE 1-continued

| Example No. | 1 | 2 | 3 | 4 | 5 | 6 |
|---|---|---|---|---|---|---|
| HDI trimer content (%) | 31 | 29 | 24 | 27 | 27 | 27 |
| HDI monomer content (%) | 0.4 | 0.4 | 0.3 | 0.3 | 0.3 | 0.4 |
| Dispersibility in water | o | o | o | Δ | o | o |
| Dispersibility in emulsion | o | o | o | o | o | o |

TABLE 2

| | Example | | | Comparataive Ex. | | |
|---|---|---|---|---|---|---|
| | 7 | 8 | 9 | 1 | 2 | 3 |
| Self-emulsifiable polyisocyanate mixture | G | H | I | J | K | L |
| NCO content (%) | 18.0 | 18.8 | 13.0 | 16.6 | 20.6 | 24.0 |
| Viscosity (cP/25° C.) | 800 | 450 | 1050 | 2660 | 2160 | 30 |
| Functionality | 2.9 | 2.7 | 2.5 | 3.4 | 3.7 | 2.0 |
| Carbon-branched dihydric alcohol content (%) | 1.9 | 3.3 | 1.1 | | | 1.7 |
| Hydrophilic surfactant content (%) | 6.4 | 9.9 | 13.9 | 13.8 | 2.0 | 6.6 |
| Aliphatic compound content (%) | | | 12.5 | | | |
| Carbon-unbranched glycol content (%) | | | | 2.2 | 2.5 | |
| HDI dimer content (%) | 10 | 13 | 7 | | | 80 |
| HDI trimer content (%) | 22 | 25 | 19 | 26 | 41 | 15 |
| HDI monomer content (%) | 0.3 | 0.3 | 0.3 | 0.4 | 0.4 | 0.5 |
| Dispersibility in water | Δ | o | Δ | x | x | o |
| Dispersibility in emulsion | o | o | o | x | x | o |

By introducing uretdione group to make the viscosity lower, the dispersibility became good.

[Preparation of aqueous coating composition and evaluation of coating film using the same]

Production of aqueous urethane emulsion

Production Example 3

In a reactor equipped with a stirrer, a thermometer, a nitrogen-sealing tube and a condenser were placed 461.1 parts of N-980N (polycarbonate diol having a molecular weight of 2,000 manufactured by NIPPON POLYURETHANE INDUSTRY CO., LTD.), 150.1 parts of isophorone diisocyanate (referred to hereinafter as IPDI) and 0.06 part of dibutyltin dilaurate, and the temperature of the resulting mixture was elevated to 75° C., at which temperature the mixture was subjected to reaction for two hours, to obtain a reaction temperature having an NCO content of 6.0%. Subsequently, this reaction mixture was cooled to 40° C., and thereafter, 29.6 parts of dimethylolpropionic acid and 252.8 parts of acetone were added thereto, after which the resulting mixture was subjected to reaction for three hours, to obtain a reaction mixture having an NCO content of 1.8%. Further, 273.2 parts of acetone, 30.3 parts of isophoronediamine and 2.4 parts of monoethanolamine were added thereto, and the resulting mixture was subjected to reaction for 20 minutes. To this reaction mixture was added 1,562.5 parts of water, and the mixture was stirred at a high speed to be phase-transferred. The acetone was removed from this mixture by distillation to obtain a urethane emulsion A having a viscosity of 100 cP/25° C. and a solid content of 30.1% (aqueous emulsion having active hydrogen atom capable of reacting at ordinary temperature).

Production Example 4

In a reactor equipped with a stirrer, a thermometer, a nitrogen-sealing tube and a condenser were placed 317.2 parts of N-981 (polycarbonate diol having a molecular weight of 1,000 manufactured by NIPPON POLYURETHANE INDUSTRY CO., LTD.), 133.4 parts of IPDI and 0.08 part of dibutyltin dilaurate, and the temperature of the resulting mixture was elevated to 75° C., at which temperature the mixture was subjected to reaction for two hours, to obtain a reaction mixture having an NCO content of 5.2%. Subsequently, to this reaction mixture was added 25.5 parts of polyoxyethylene methyl ether (hydroxyl value: 80, manufactured by Nippon Emulsifier Industry Co., Ltd.), and the resulting mixture was subjected to reaction for three hours to obtain a reaction mixture having an NCO content of 4.6%. Further, this reaction mixture was cooled to 25° C., and thereafter, 474.8 parts of acetone and 45.2 parts of isophoronediamine were added thereto, and the resulting mixture was subjected to reaction for 20 minutes. To this reaction mixture was added 1,231.3 parts of water, and the mixture was stirred at a high speed to be phase-transferred. The acetone was removed from this mixture by distillation to obtain a urethane emulsion B having a viscosity of 700 cP/25° C. and a solid content of 27.9% (aqueous emulsion free from active hydrogen atom capable of reacting at ordinary temperature).

Preparation of aqueous coating composition and formation of coating film using the same

EXAMPLES 10, 11, 13 and 14

80 Parts of the urethane emulsion A or B was mixed with 18 parts of a pigment and 2 parts of an additive (dispersing agent, thickener, defoaming agent or the like), and 5 parts of the self-emulsifiable polyisocyanate mixture obtained in Example 1 or 4 was further added thereto, after which the mixture was stirred by hand using a glass rod, upon which the mixture was easily dispersed. The dispersion obtained was coated on a soft steel plate by a bar coater so that the dried film thickness became 30 to 40μ, and thereafter, dried at 80° C. for 20 minutes and then allowed to stand for five hours.

EXAMPLES 12 AND 15

53 Parts of the acrylic rubber emulsion A was mixed with 18 parts of a pigment, 2 parts of an additive (dispersing agent, thickener, defoaming agent or the like) and 27 parts of water, and thereafter 5 parts of the self-emulsifiable polyisocyanate mixture obtained in Example 1 or 4 was further added thereto, after which the resulting mixture was stirred by hand using a glass rod, upon which the mixture was easily dispersed. Using this dispersion, coating was conducted in the same manner as in Example 10.

Comparative Examples 4, 5, 7 and 8

80 Parts of the urethane emulsion A or B was mixed with 18 parts of a pigment and 2 parts of an additive (dispersing agent, thickener, defoaming agent or the like), and thereafter, 5 parts of the self-emulsifiable polyisocyanate mixture obtained in Comparative Example 1 or 3 was added thereto, after which the resulting mixture was coated in the same manner as in Example 10.

Comparative Examples 6 and 9

53 Parts of the acrylic emulsion A was mixed with 18 parts of a pigment, 2 parts of an additive (dispersing agent, thickener, defoaming agent or the like) and 27 parts of water, and thereafter, 5 parts of the self-emulsifiable polyisocyanate mixture obtained in Comparative Example 1 or 3 was added thereto, after which the resulting mixture was coated in the same manner as in Example 10.

Evaluation of coating film

Gloss was determined by measuring the specular gloss by a glossmeter at an angle of incidence of 60° and water resistance was determined by immersing in tap water at 20° C. for one day and then checking the state of coating surface.

The results obtained are shown in Tables 3 and 4, provided that in Tables 3 and 4, only the kinds of self-emulsifiable polyisocyanate mixture and aqueous emulsion among the starting materials used are shown.

In Tables 3 and 4, the evaluation criterion for water resistance is as follows:

TABLE 3

| Example No. | 10 | 11 | 12 | 13 | 14 | 15 |
| --- | --- | --- | --- | --- | --- | --- |
| Self-emulsifiable polyisocyanate mixture | A | A | A | D | D | D |
| Urethane emulsion | A | B | | A | B | |
| Acrylic rubber emulsion | | | A | | | A |
| Gloss | 92 | 86 | 85 | 85 | 80 | 77 |
| Water resistance | ○ | Δ | ○ | ○ | Δ | ○ |

TABLE 4

| Comparative Example No. | 4 | 5 | 6 | 7 | 8 | 9 |
| --- | --- | --- | --- | --- | --- | --- |
| Self-emulsifiable polyisocyanate mixture | J | J | J | L | L | L |
| Urethane emulsion | A | B | | A | B | |
| Acrylic rubber emulsion | | | A | | | A |
| Gloss | 56 | 48 | 40 | 80 | 77 | 77 |
| Water resistance | x | x | x | x | x | x |

By introducing the branched dihydric alcohol having 2 or more carbon atoms each having branch into the self-emulsifiable polyisocyanate mixture, the compatibility with the polyol resin was enhanced and the gloss and water resistance became good.

[Preparation of aqueous adhesive composition and evaluation thereof]

EXAMPLES 16 and 17

A polyurethane RIM (reactive injection molding) article, FRP, ABS and a steel plate (JIS G3141<SPCC-SB>, specification: pf-1077, made by Nippon Test Panel Kogyo Kabushiki Kaisha, referred to hereinafter as bonderized steel plate) each having a thickness of 3 mm were degreased with trichloroethylene, and coated with a liquid mixture of 100 parts of the acrylic rubber emulsion A and 10 parts of the self-emulsifiable polyisocyanate mixture obtained in Example 4 or 5 so that the dried film thickness became 40–50μ. The resulting coatings were preliminarily dried at 80° C. for five minutes, and two plates of each kind were put one on the other so that air bubbles were not present therebetween and the resulting assemblies were allowed to stand at a pressure of 25 kg/cm² at 80° C. for ten minutes to press-bond the plates. Thereafter, each of the bonded plates was dried and then cut into a 25-mm width and subjected to measurement of a bonding strength (kg/25 mm) using Tensilon UTM-500 manufactured by Kabushiki Kaisha Orientec at a tensile speed of 100 mm/min according to JIS K6854.

The results obtained are shown in Table 5, provided that in Table 5, only the kinds of the self-emulsifiable polyisocyanate mixtures among the materials used are shown (the same applies hereinafter).

Comparative Examples 10 and 11

Using a liquid mixture of 100 parts of the acrylic rubber emulsion A and 5 parts of the self-emulsifiable polyisocyanate mixture obtained in Comparative Example 1 or 3, evaluation was conducted in the same manner as in Example 16. The results obtained are shown in Table 5.

TABLE 5

| | Example | | Comp. Ex. | |
| --- | --- | --- | --- | --- |
| | 16 | 17 | 10 | 11 |
| Self-emulsifiable polyisocyanate mixture | D | E | J | L |
| Bonding strength (kg/25 mm) | | | | |
| RIM article | 28 | 25 | 16 | 10 |
| FRP | 33 | 32 | 20 | 13 |
| ABS | 26 | 24 | 15 | 9 |
| Bonderized steel plate | 36 | 32 | 18 | 10 |

By lowering the viscosity of the self-emulsifiable polyisocyanate mixture, the dispersion in an aqueous emulsion is enhanced and the bonding strength becomes large.

[Preparation of aqueous coating composition and evaluation of performance of coating film obtained therefrom]

Preparation of aqueous coating composition and formation of coating film using the same

EXAMPLES 18 TO 20

To 30 parts of the self-emulsifiable polyisocyanate mixture obtained in Example 2, 6 or 9 was added 100 parts of water and they were mixed by stirring with a glass rod, upon which the self-emulsifiable polyisocyanate mixture was easily dispersed in water. After a lapse of one hour from the dispersion, a calcium silicate plate was coated with the dispersion and the resulting assembly was kept at room temperature for one hour and then at 80° C. for three hours.

Comparative Examples 12 to 14

To 30 parts of the self-emulsifiable polyisocyanate mixture obtained in Comparative Example 1, 2 or 3 was added 100 parts of water, and they were mixed by stirring with a glass rod. A coating film was prepared using this dispersion in the same manner as in Example 18.

Evaluation of performance of coating film

The state and adhesive properties of the coating film were evaluated. The state of coating film was checked by visual observation. The adhesive properties were evaluated by the cross-cut test method according to JIS K5400.

The evaluation results are shown in Table 6, provided that in Table 6, only the kinds of the self-emulsifiable polyisocyanate mixtures among the materials used are shown.

In Table 6, the evaluation criterion of the state of coating film was as follows:

Good o>Δ>x Bad

TABLE 6

|  | Example | | | Comp. Ex. | | |
| --- | --- | --- | --- | --- | --- | --- |
|  | 18 | 19 | 20 | 12 | 13 | 14 |
| Emulsifiable polyiso-cyanate mixture | B | F | I | J | K | L |
| Coating film state | Δ | o | o | x | Δ | o |
| Cross-cut test (points) | 10 | 10 | 8 | 6 | 2 | 2 |

By lowering the viscosity of the self-emulsifiable polyisocyanate mixture, the dispersion in water was enhanced and the state of coating film and adhesive properties became good.

[Preparation of aqueous adhesive composition and evaluation thereof]

EXAMPLES 21 AND 22

A lauan veneer having a size of 2.5 cm×10 cm ×3.0 mm was coated with a liquid mixture of 100 parts of water and 100 parts of the self-emulsifiable polyisocyanate mixture obtained in Example 3 or 7 so that the coating amount became 200 g/m$^2$ and the coating area became 2.5 cm×2.5 cm, and thereafter, the lauan veneers of the same kind were put one on the other so that air bubbles were not present therebetween. The resulting assembly was allowed to stand at a pressure of 10 kg/cm$^2$ at room temperature for two hours and then at 120° C. for ten minutes.

Subsequently, the normal bonding strength (kg/cm$^2$) and the heat bonding strength (after allowed to stand at 120° C. for 24 hours) (kg/cm$^2$) were measured using Tensilon UTM-500 manufactured by Kabushiki Kaisha Orientec at a tensile speed of 2 mm/min.

The results obtained are shown in Table 7, provided that in Table 7, only the kinds of the self-emulsifiable polyisocyanate mixtures among the materials used are shown (the same applies hereinafter).

Comparative Examples 15 and 16

Using a liquid mixture of 100 parts of the acrylic rubber emulsion A and 100 parts of the self-emulsifiable polyisocyanate mixture obtained in Comparative Example 1 or 3, evaluation was conducted in the same manner as in Example 21. The results obtained are shown in Table 7.

TABLE 7

|  | Example | | Comp. Ex. | |
| --- | --- | --- | --- | --- |
|  | 21 | 22 | 15 | 16 |
| Emulsifiable polyisocyanate mixture | C | G | J | L |
| Normal bonding strength (kg/cm$^2$) | 35.8 | 41.9 | 4.9 | 6.1 |
| Heat bonding strength (kg/cm$^2$) | 28.7 | 30.5 | 3.3 | 4.2 |

By lowering the viscosity of the self-emulsifiable polyisocyanate mixture, the dispersion in water was enhanced and the bonding strength became large.

What is claimed is:

1. A self-emulsifiable polyisocyanate mixture having (i) a free hexamethylene diisocyanate monomer content of not more than 1.0% by weight and (ii) an average NCO functionality of 2.0 to 3.7 obtained by subjecting hexamethylene diisocyanate to urethanation with (a) a carbon-branched dihydric alcohol having overall 4 to 35 carbon atoms, of which 2 to 33 carbon atoms are a total number of the carbon atoms possessed by one or more branches, wherein component (a) is bonded in a proportion of 0.1 to 15% by weight based on the weight of the self-emulsifiable polyisocyanate compound, (b) a hydrophilic surfactant having one or more active hydrogen atoms capable of reacting with isocyanate group and 3 to 90 alkylene oxide units, wherein component (b) is bonded in a proportion of 0.1 to 40% by weight based on the weight of the self-emulsifiable polyisocyanate mixture, (c) optionally an aliphatic compound having one or more active hydrogen atoms capable of reacting with isocyanate group and 8 or more carbon atoms, wherein component (6) is bonded in a proportion of 0 to 30% by weight based on the weight of the self-emulsifiable polyisocyanate compound, and (d) optionally a carbon-unbranched glycol having 1 to 10 carbon atoms, wherein component (d) is bonded in a proportion of 0 to 5% by weight based on the weight of the self-emulsifiable polyisocyanate mixture, and to uretdione-forming reaction and isocyanurate-forming reaction, and wherein (1) the percentage of hexamethylene diisocyanate dimer having uretdione group corresponds to an area percentage determined by a differential refractometer detection in a gel permeation chromatography (GPC) of 3 to 55%, and (2) the percentage of hexamethylene diisocyanate trimer having isocyanurate group corresponds to an area percentage determined by a differential refractometer detection in the GPC of 5 to 45%.

2. The self-emulsifiable polyisocyanate mixture according to claim 1, wherein the dihydric alcohol (a) is bonded in a proportion of 0.3 to 10% by weight.

3. The self-emulsifiable polyisocyanate mixture according to claim 1, wherein the hydrophilic surfactant (b) is a nonionic surfactant.

4. The self-emulsifiable polyisocyanate mixture according to claim 3, wherein the nonionic surfactant is bonded in a proportion of 0.5 to 30% by weight based on the self-emulsifiable polyisocyanate mixture.

5. The self-emulsifiable polyisocyanate mixture according to claim 1, wherein the aliphatic compound (c) is bonded in a proportion of up to 20% by weight based on the weight of the self-emulsifiable polyisocyanate mixture.

6. The self-emulsifiable polyisocyanate mixture according to claim 5 wherein the aliphatic compound (c) is a fatty acid ester.

7. The self-emulsifiable polyisocyanate mixture according to claim 1, wherein the glycol (d) is bonded in a proportion of 0.1 to 4% by weight.

8. The self-emulsifiable polyisocyanate mixture according to claim 1, wherein the area percentage (1) of the hexamethylene diisocyanate dimer is 4 to 50%.

9. The self-emulsifiable polyisocyanate mixture according to claim 1, wherein the area percentage (2) of the hexamethylene diisocyanate trimer is 10 to 40%.

10. An aqueous coating composition which comprises the self-emulsifiable polyisocyanate mixture according to claim 1 and at least one member selected from the group consisting of a water-soluble resin and an aqueous emulsion in such a proportion that the amount of the self-emulsifiable polyisocyanate mixture is 0.5 to 100 parts by weight per 100 parts by weight of the water-soluble resin, the solid content of the aqueous emulsion or a total of the two.

11. The aqueous coating composition according to claim 10, which further comprises an additive in a proportion of 0.5 to 100 parts by weight per 100 parts by weight of the water-soluble resin, the solid content of the aqueous emulsion or a total of the two.

12. A aqueous adhesive composition which comprises the self-emulsifiable polyisocyanate mixture according to claim 1 and at least one member selected from the group consisting of a water-soluble resin and an aqueous emulsion in such a proportion that the amount of the self-emulsifiable polyisocyanate mixture is 0.5 to 100 parts by weight per 100 parts by weight of the water-soluble resin, the solid content of the aqueous emulsion or a total of the two.

13. The aqueous adhesive composition according to claim 12, which further comprises an additive in a proportion of 0.5 to 100 parts by weight per 100 parts by weight of the water-soluble resin, the solid content of the aqueous emulsion or a total of the two.

14. An aqueous dispersion for use as a paint which comprises 1 to 200 parts by weight of the self-emulsifiable polyisocyanate mixture according to claim 1 and 100 parts by weight of water.

15. The aqueous dispersion for use as a paint according to claim 14, which further comprises an additive.

16. An aqueous dispersion for use as an adhesive which comprises 1 to 200 parts by weight of the self-emulsifiable polyisocyanate mixture according to claim 1 and 100 parts by weight of water.

17. The aqueous dispersion for use as an adhesive according to claim 16, which further comprises an additive.

18. A self-emulsifiable polyisocyanate mixture according to claim 1 having an NCO content of 5–25% by weight.

19. A self-emulsifiable polyisocyanate mixture according to claim 1 having an NCO content of 7–24% by weight.

* * * * *

UNITED STATES PATENT AND TRADEMARK OFFICE
CERTIFICATE OF CORRECTION

PATENT NO. : 5,631,341
DATED : May 20, 1997
INVENTOR(S) : Takeshi Morishima et al.

It is certified that error appears in the above-indentified patent and that said Letters Patent is hereby corrected as shown below:

Column 11 line 21, delete "hours" and insert therefor --Torr--;

Column 17, after line 15, insert the following:

--Pass  o  >  △  >  x Whitening--

Column 20, line 17, delete "(6)" and insert therefor --(c)--.

Signed and Sealed this

Nineteenth Day of August, 1997

Attest:

BRUCE LEHMAN

Attesting Officer

Commissioner of Patents and Trademarks